US009026475B2

(12) United States Patent
Wu

(10) Patent No.: US 9,026,475 B2
(45) Date of Patent: May 5, 2015

(54) AREA TRIM SERVICE BUSINESS METHOD

(75) Inventor: Kuo H. Wu, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 813 days.

(21) Appl. No.: 12/581,948

(22) Filed: Oct. 20, 2009

(65) Prior Publication Data

US 2010/0114761 A1   May 6, 2010

Related U.S. Application Data

(60) Provisional application No. 61/110,010, filed on Oct. 31, 2008.

(51) Int. Cl.
| | | |
|---|---|---|
| *G06Q 10/06* | (2012.01) | |
| *G06Q 10/08* | (2012.01) | |
| *G06Q 10/10* | (2012.01) | |
| *G06Q 30/06* | (2012.01) | |
| *G06F 17/50* | (2006.01) | |
| *G06Q 20/10* | (2012.01) | |

(52) U.S. Cl.
CPC .......... *G06F 17/5081* (2013.01); *G06Q 10/101* (2013.01); *G06Q 20/10* (2013.01)

(58) Field of Classification Search
USPC .................................................. 705/1.1–912
See application file for complete search history.

(56) References Cited

U.S. PATENT DOCUMENTS

| | | | |
|---|---|---|---|
| 6,938,226 B2 | 8/2005 | Nguyen et al. | |
| 7,698,662 B1* | 4/2010 | Wu et al. | 716/104 |
| 2005/0278267 A1* | 12/2005 | Mabuchi et al. | 705/500 |
| 2006/0075374 A1* | 4/2006 | McElvain | 716/17 |
| 2008/0222580 A1* | 9/2008 | Banerjee et al. | 716/4 |
| 2008/0222581 A1* | 9/2008 | Banerjee et al. | 716/4 |
| 2008/0222589 A1* | 9/2008 | Banerjee | 716/11 |

OTHER PUBLICATIONS

TELA Innovations, Technology Overview, Tela based logic blocks low k1 lithography, http://www.tela-inc.com/technology.pho, Oct. 22, 2008, 6 pages.

* cited by examiner

*Primary Examiner* — Jonathan Ouellette
(74) *Attorney, Agent, or Firm* — Haynes and Boone, LLP

(57) ABSTRACT

A method for manufacturing integrated circuits ("ICs") is disclosed. The method pertains to providing third-party technology in the form of an IC design library to foundry customers for designing IC products using alternate rule sets. Aggressive rules pertaining to IC layout are used to reduce device size, resulting in more device per wafer for the customer. The method includes a library creator creating a slim cell library, a slim cell library being provided to a customer to enable the customer to generate a slim IC design; an IC fabricator charging the customer a per-wafer premium to fabricate the slim IC design; the IC fabricator providing a first portion of the premium to a first entity, wherein the first entity is a contributor of technology for enabling creation of the slim cell library; and the IC fabricator providing a second portion of the premium to the library creator.

14 Claims, 2 Drawing Sheets

AREA TRIM SERVICE BUSINESS METHOD

PRIORITY DATA

This application claims priority to Provisional Application Serial No. 61/110,010 filed on Oct. 31, 2008, entitled "AREA TRIM SERVICE BUSINESS METHOD", the entire disclosure of which is incorporated herein by reference.

BACKGROUND

A constant goal of integrated circuit ("IC") designers is to minimize the size of individual features within ICs so as to improve the device density of the overall system. Typically, a standard cell library of macros for individual features is used to lay out the IC, with various layout design rules being applied to regulate the interactions among the macros. All standard cell libraries are created using the same published design rules. However, the public design rules applicable to standard cells are not applied to memory bit cells, which are hand-crafted to be as small as possible.

As a result of the requirements imposed on standard cell libraries due to the necessity to adhere to design rules, many ICs are not designed to be as small as they may otherwise be designed without the rules. It is desired to minimize IC designs, thereby increasing the number of ICs that can be fabricated from a single wafer.

SUMMARY

One embodiment is a method for manufacturing integrated circuits ("ICs"). The method comprises receiving an innovative technology from a first entity; creating a traded rules-based design rule manual using the innovative technology; and providing a traded rules-based SPICE module. The method further comprises creating a slim cell library using the innovative technology, traded rules-based design rule module, and traded rules-based SPICE module; providing the slim cell library for customers to generate a slim IC design; and manufacturing the slim IC.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
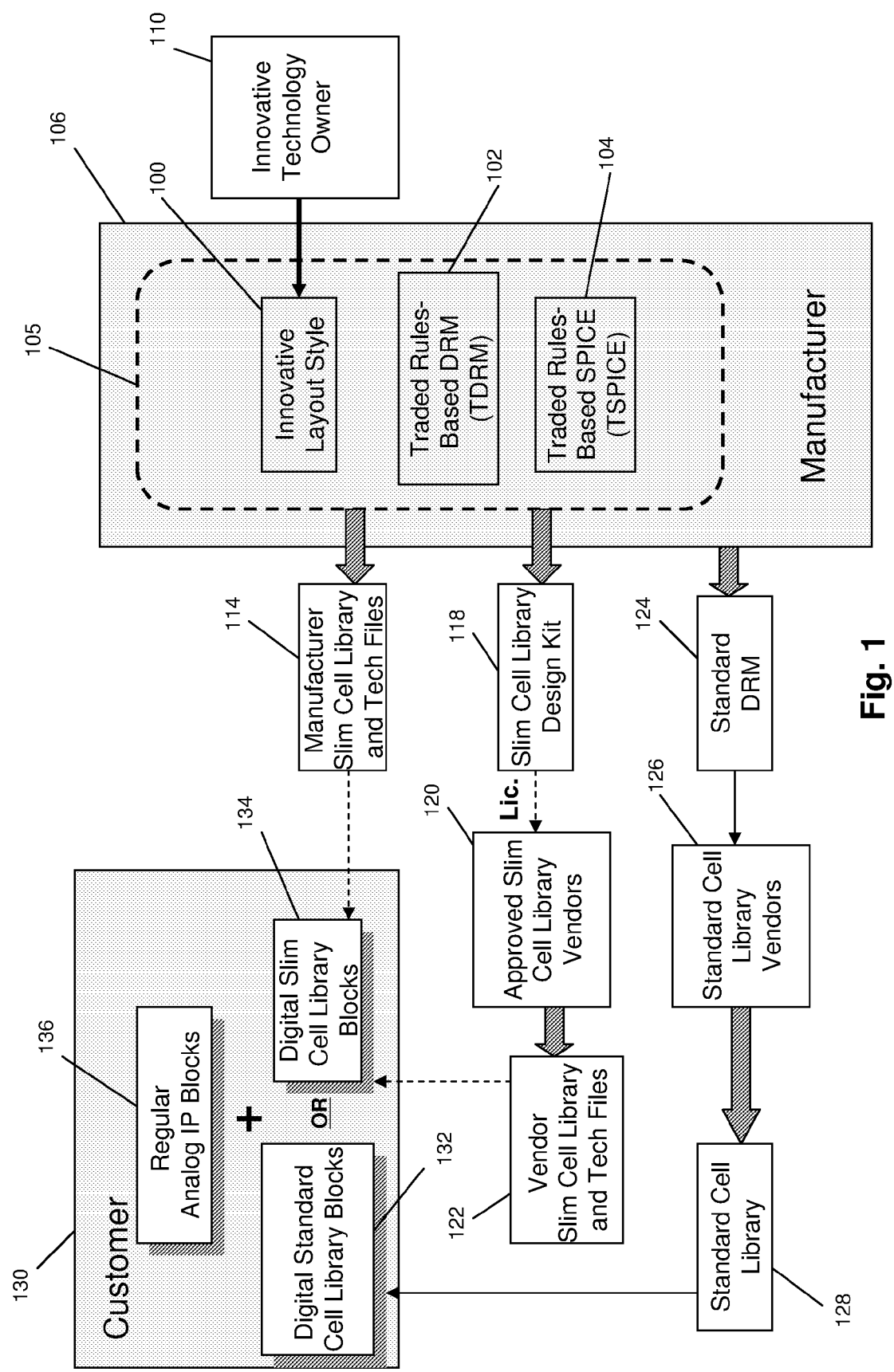
FIG. 1 illustrates an IC design methodology in accordance with one embodiment.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation or placement of a first feature over or on a second feature in the description that follows may include embodiments in which the first and second features are formed in direct contact, and may also include embodiments in which additional features may be formed interposing the first and second features, such that the first and second features may not be in direct contact, or may include different arrangements of the features.

Referring to FIG. 1, an IC design methodology in accordance with one embodiment comprises a plurality of modules including a layout style module 100, a traded rules-based design rule manual ("TDRM") module 102, and a traded rules-based SPICE ("TSPICE") module 104, the combination of which is referred to as "slim cell technology" and is designated in FIG. 1 by a reference numeral 105. The slim cell technology 105 is employed by a semiconductor manufacturer, or foundry 106 for purposes hereinafter described. In accordance with features of various embodiments, the TDRM module 102 comprises a set of more aggressive design rules, or "traded rules," for maximizing layout size reduction for standard cells, resulting in smaller IC cell blocks, which are referred to herein as "slim cells." In particular, the dimensions of a slim cell will be markedly smaller than the respective dimensions of a standard cell to which the slim cell corresponds, resulting in smaller overall dimensions for an IC designed using the slim cell technology 105. The size reduction of the IC is further optimized by employing the layout style imposed via the layout style module 100 in combination with the traded rules.

As illustrated in FIG. 1, the technology underlying the layout style module 100 is owned by an innovative technology owner ("ITO") 110. An ITO may be a second entity separate from the manufacturer. In accordance with features of one embodiment, the ITO 110 grants a license to use the technology comprising the module 100 to the foundry 106. Referring again to FIG. 1, the slim library technology 105 is used to generate a plurality of elements, including a slim cell library with associated tech files, designated by a reference numeral 114, and a slim library design kit 118 for enabling authorized, or licensed, third party vendors, such as a vendor 120, to create slim libraries with associated tech files, such as a slim library/tech files 122.

A number of slim cell libraries with associated tech files may be thus generated. Under the license, the manufacturer (foundry 106) generates a default slim cell library based on the innovative layout style. Additional libraries may be generated by approved vendors, who may be sublicensees of the foundry.

Additionally, the foundry 106 may make available a standard DRM module 124 to enable authorized, or licensed, third party vendors, such as a vendor 126, to produce regular standard cell libraries, such as a standard cell library 128. More than one standard cell library may be created by standard cell library vendors and by the foundry.

A customer 130 can then choose to use standard library blocks 132 from the standard cell library 128 or slim cell blocks 134 from one of the slim cell libraries 114, 122, or both, in combination with regular analog IP blocks 136, to design an IC in a conventional fashion.

Note that while FIG. 1 is described using the innovative layout style as the technology provided by the second entity, the process is applicable to other technologies. For example, an ITO may provide specific IP blocks or technology for addressing power usage, device speed, number of elements, and other technology from which special libraries and tech files may be created using special rules-based DRM suitable for the technology. A customer would be able to choose the special rule for designing its IC to achieve an objective such as minimizing device size or power consumption.

Figure 2:
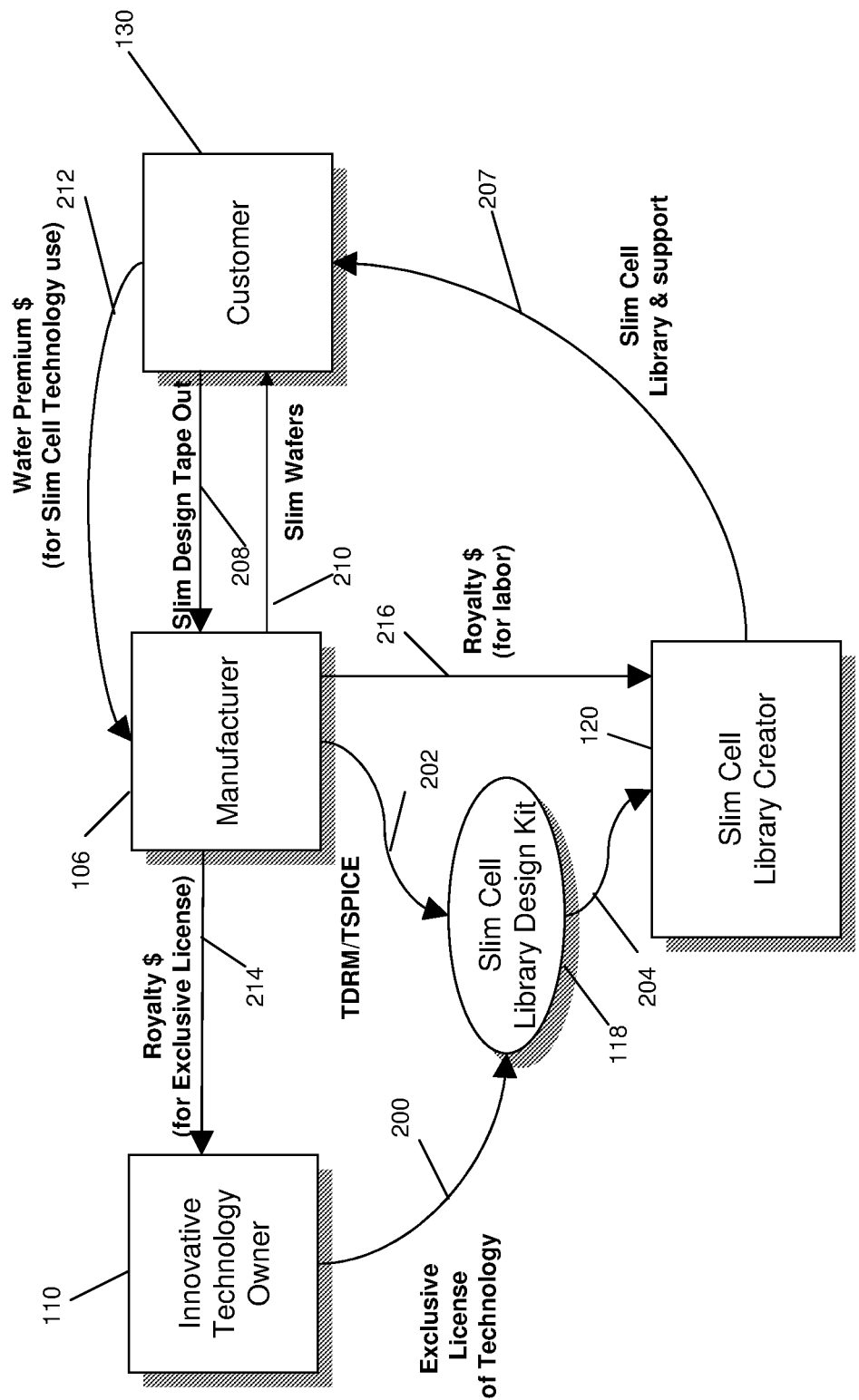
FIG. 2 illustrates a business model for monetizing the IC design methodology of FIG. 1 in accordance with one embodiment.

FIG. 2 illustrates a business model for using the IC design methodology of FIG. 1 in accordance with various embodiments. As shown in FIG. 2, the ITO 110 exclusively licenses its technology, in the form of the innovative layout style module 100 (FIG. 1), to the foundry 106, as represented in FIG. 2 by an arrow 200. As previously described with reference to FIG. 1, the module 100 is employed in combination with the modules 102 and 104 (as represented by an arrow 202) to create the slim cell library design kit 118, which is provided to the slim cell library creator 120, as represented by an arrow 204. The slim cell library creator 120 may be one or more independent third party; alternatively, the slim cell library creator may be the ITO 110 or the foundry 106. In any case, the slim cell library creator 120 provides the slim cell library and support to a customer 130, as represented by an arrow 207, who uses the slim cell library to design ICs.

The customer 130 provides a tape out of the IC design to the foundry 106, as represented by an arrow 208, which fabricates the wafers in accordance with the customer's design and returns them to the customer, as represented by an arrow 210. In accordance with features of the illustrated embodiment, because the slim library technology described herein enables more ICs to be fabricated on a single wafer, the customer 130 pays to the foundry 106 a premium per wafer fabricated using IC designs based on the slim technology, as represented by an arrow 212. The premium is the payment difference between using the slim cell library and using the standard cell library. According to certain embodiments, the amount of the premium may be based on a percentage of additional ICs fabricated as compared to using a standard cell library. Of course, other methods for determining the premium may be used. A portion of this premium from the customer 130 is provided to the ITO 110 in return for the exclusive technology license, as represented by an arrow 214. Additionally, a portion of the premium is paid to the slim cell library creator 120, as represented by an arrow 216, to compensate the library creator for the time and labor involved in creating the slim cell library provided to the customer 130.

As a direct result of the embodiments described herein, the customer 130 gains an economic benefit due to the additional IC chips that can be fabricated on a single wafer and pay a wafer premium charged by the foundry. The premium should be determined such that the customer 130 derives a net economic benefit. Additionally, the ITO 110 and any library creator gain an economic benefit through the royalty stream from the foundry 106. Finally, the foundry gains an economic benefit through the additional wafer premium and providing additional value to its customers without changing existing manufacturing processes.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for manufacturing integrated circuits ("ICs"), the method comprising:
   providing a standard IC cell library to one or more customers for generating a standard IC design;
   providing one or more slim IC cell libraries having a layout size reduction in comparison with the standard IC cell library, wherein the slim IC cell libraries include technology files stored on a computer;
   providing the one or more slim IC cell libraries to the one or more customers for generating a slim IC design;
   receiving a tape-out file of the slim IC design from a customer, wherein the tape-out file is formed by selecting at least one cell from the one or more slim IC cell libraries and placing it in a layout file for an integrated circuit, wherein the layout file is used by the computer to generate the tape-out file;
   manufacturing a plurality of wafers including slim ICs from the slim IC design using the tape-out file, wherein the manufacturing includes fabricating a number of chips per wafer that include the at least one cell from the one or more slim IC cell libraries;
   calculating a per-wafer premium associated with the manufacturing the plurality of wafers, wherein the calculating the per-wafer premium includes:
      determining a percentage of additional chips per wafer of the plurality of wafers provided when using the at least one cell from the slim IC cell library in the tape-out file in comparison with using a cell of the standard IC cell library in the tape-out file; and
      using the determined percentage to calculate the per-wafer premium;
   charging the customer the per-wafer premium to manufacture the slim ICs, the premium being paid by the customer to a manufacturer of the slim ICs;
   providing a first portion of the premium to a first entity, wherein the first entity is a contributor of technology for enabling creation of the slim IC cell library and the first portion is provided to the first entity by the manufacturer; and
   providing a second portion of the premium to a creator of the slim IC cell library.

2. The method of claim 1 wherein the technology contributed by the first entity comprises an innovative IC layout style.

3. The method of claim 1, wherein more slim ICs fit per wafer than would fit using standard ICs from the standard IC design.

4. The method of claim 1, wherein the providing one or more slim IC cell libraries includes receiving the libraries from the first entity.

5. A method for improving the manufacture of integrated circuits ("ICs"), the method comprising:
   offering a slim cell library based on slim cell library technology, the slim cell library being provided to a customer to enable the customer to generate a slim IC design including at least one cell from the slim cell library, wherein the at least one cell has a smaller dimension than an instance of a standard cell having the same function;
   receiving from the customer a tape-out file that defines a layout of the slim IC design including the at least one cell;
   using the tape-out file to fabricate a quantity of ICs on a wafer having the slim IC design;
   calculating a premium by:
      determining the quantity of ICs with the slim IC design on the wafer;

using a computer to determine another quantity of ICs that would fit on the wafer having a design using the standard cell in place of the at least one cell from the slim cell library;

calculating a percentage that the quantity of ICs is greater than the another quantity of ICs; and using the calculated percentage to determine the premium;

collecting from the customer the premium;

providing a first portion of the premium to a contributor of know how to the slim cell library technology, the first portion being paid to the contributor by the manufacturer, the manufacturer having a license to the know how; and providing a second portion of the premium to a creator of the slim cell library.

6. The method of claim 5 further comprising, prior to the creating a slim cell library, providing a slim cell library design kit to a creator of the slim cell library.

7. The method of claim 6 wherein the technology contributed by the first entity comprises an innovative IC layout style.

8. The method of claim 7 wherein the slim cell library design kit is generated using slim cell library technology comprising the innovative IC layout style, a traded design rules based design rule manual, and a traded rules-based SPICE module.

9. The method of claim 5, wherein the offering the slim cell library includes the creator of the slim cell library providing the slim cell library to the customer.

10. A method for improving the manufacture of integrated circuits ("ICs"), the method comprising:

creating a traded rules-based design rule module (TDRM);

creating a simulation program with integrated circuit emphasis (SPICE);

using the TDRM and SPICE to create a slim cell library, wherein the slim cell library is stored on a non-transistory computer readable medium;

receiving an integrated circuit (IC) design file from a customer, wherein the IC design file includes at least one cell from the slim cell library;

manufacturing a quantity of ICs based on the IC design file, wherein the manufacturing includes forming the quantity of ICs on a wafer;

calculating a premium associated with the manufacturing the quantity of ICs, wherein the calculating the per-wafer premium includes:

determining a percentage of additional chips per wafer provided when using the IC design file having at least one cell from the slim IC cell library in comparison with using another IC design file generated only from a standard IC cell library; and using the determined percentage to calculate the premium;

charging the customer a first amount to fabricate the amount of ICs using the slim IC design, wherein the first amount includes the premium;

distributing a first portion of the premium to an entity associated with the innovative technology, the first portion being distributed to the entity associated with the innovative technology by the manufacturer as payment for a license to the innovative technology; and distributing a second portion of the premium to an entity associated with the slim cell library.

11. The method of claim 10 further comprising, generating a slim cell library design kit for a library creator to enable the library creator to create the slim cell library.

12. The method of claim 11 wherein the slim cell library design kit is generated using an innovative layout style and a traded design rules based design rule manual.

13. The method of claim 10 wherein the technology received from the first entity comprises an innovative IC layout style.

14. The method of claim 11, wherein the first entity is the library creator.

* * * * *